Dec. 15, 1959     G. O. CHRISTENSEN     2,917,346
TRACK TENSIONING DEVICE

Filed April 4, 1958                            2 Sheets-Sheet 1

Inventor
George O. Christensen
by James C. Alford
Attorney

Dec. 15, 1959   G. O. CHRISTENSEN   2,917,346
TRACK TENSIONING DEVICE
Filed April 4, 1958   2 Sheets-Sheet 2

Inventor
George O. Christensen
By James O. Elfson
Attorney

# United States Patent Office 2,917,346
Patented Dec. 15, 1959

2,917,346

TRACK TENSIONING DEVICE

George O. Christensen, Springfield, Ill., assignor to Allis-Chalmers Manufacturing Company, Milwaukee, Wis.

Application April 4, 1958, Serial No. 726,557

10 Claims. (Cl. 305—31)

This invention relates generally to self-laying track type vehicles and is more particularly concerned with providing an improved tensioning device for the endless track belt carried thereon.

For satisfactory operation the endless track belt of a conventional self-laying track type vehicle, such as a crawler tractor, must have an optimum amount of slack so that its links may ride smoothly about the track supporting structure and at the same time have sufficient tension to prevent it from jumping off. In most conventional self-laying track mechanisms tension in the track belt is maintained by an idler pulley carried on a longitudinally slidable support at the front end of the track frame. During normal operation the front idler pulley and the rear drive sprocket, which is carried on the rear of the track frame, occupy a relatively fixed position with respect to each other. During the normal operation of a crawler tractor, however, numerous conditions are encountered, such as when traversing rough or uneven terrain, operating in reverse or braking, that give rise to forces that increase the tension in the track belt and tend to urge the front idler longitudinally of the track frame in a direction toward the rear drive sprocket. In order to resist such forces various types of spring operated mechanisms have been suggested in which one or more preloaded coil springs exert the necessary pressure for maintaining the track idler in proper engagement with the track belt. Under certain conditions, however, in order to permit a rock or other solid objects to pass between the track belt and one of the members of its supporting structure, such as the idler wheel, a truck roller or drive sprocket, the spring operated mechanism must yield to permit movement of the idler in a direction toward the drive sprocket to a track release position and after the obstruction has been cleared the spring pressure must be sufficient to restore the idler to the normal operating position.

It is well known that as a spring is compressed, the reactive thrust of the spring is built up proportionally; and hence as the front idler is displaced in the direction toward the sprocket causing further compression of the spring or springs, the tension in the track belt increases in proportion to the displacement. Very often during the period of time that the front idler is displaced and the obstruction remains lodged between the track belt and a supporting member, tension in the track belt is excessive tending to unduly stress the track links and to impose extreme loads upon the track supporting structure. In order to overcome this tendency it is recommended that a track tensioning mechanism be designed so as to maintain a constant force upon the front idler throughout its entire displacement to a track release position. To accomplish this ideal result others have suggested various means including toggle type linkages to be interposed between the spring mechanism and the front idler. Such prior art mechanisms, however, have not been entirely satisfactory for a number of reasons, namely; they involve a multiplicity of moving parts that are expensive to manufacture and assemble; and in operation they have not been completely successful in maintaining a constant pressure upon the idler pulley throughout its full releasing motion.

It is, therefore, an object of the present invention to provide an improved track tensioning device which fulfills the requirements and overcomes the difficulties and disadvantages hereinbefore mentioned in an entirely satisfactory manner.

It is another object of the present invention to provide an improved track tensioning device that utilizes a simple torsion bar to supply the necessary elastic force.

Another object of the present invention is to provide an improved track tensioning device which maintains a relatively constant force upon the idler pulley during its displacement into the release position.

A further object of the present invention is to provide an improved track tensioning device which includes a simple torsion bar to provide reactive thrust for maintaining a relatively constant force upon the idler pulley of a self-laying track mechanism throughout its full releasing motion.

These and other objects and advantages will become obvious to those skilled in the art when the following detailed description is read in conjunction with the accompanying drawings in which.

Figure 1:
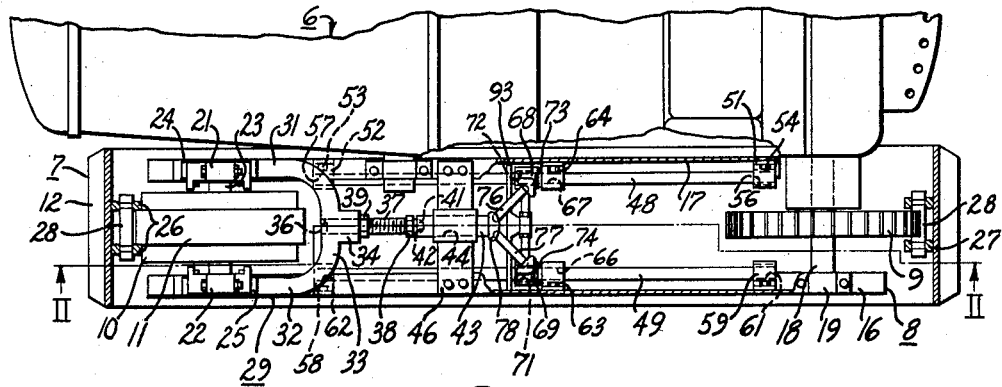
Fig. 1 is a top view of one-half of a crawler tractor having been divided by a vertical plane extending along the longitudinal axis thereof and having the track belt of the self-laying track mechanism cut away so as to expose the track tensioning device.

Referring to Fig. 1, a crawler tractor, only one-half of which is shown, is indicated generally by the reference character 6. Crawler tractor 6 is of the conventional type comprising a main body and a pair of self-laying track mechanisms at opposite lateral sides of the main body. Although only one self-laying mechanism is shown, being indicated generally by the reference character 7, it is to be understood that the description of the track mechanism 7 will apply equally to the track mechanism located on the opposite side of the main body of the tractor 6 which is not shown.

Figure 2:
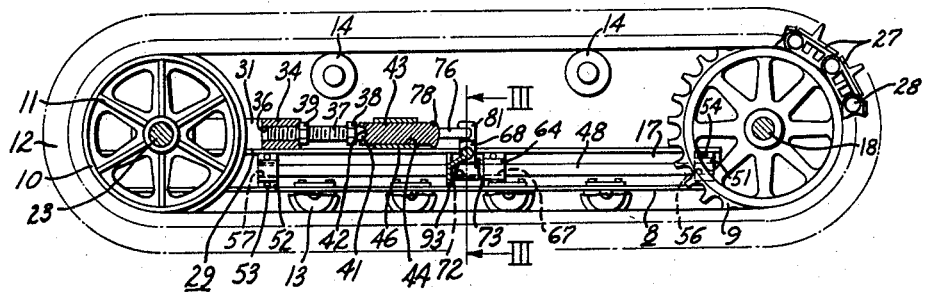
Fig. 2 is a sectional view of the self-laying track mechanism taken along line II—II in Fig. 1 showing the track tensioning device.

Referring to Figs. 1 and 2, the track mechanism 7 except for the track tensioning device is of well known design and construction comprising a track frame 8, drive sprocket 9, front idler assembly 10, track belt 12, truck wheels 13 and track support rollers 14.

Track frame 8 includes an outer channel member 16 and an inner channel member 17 both extending in spaced parallel relation to each other and being rigidly interconnected by suitable bracing means, not shown. Drive sprocket 9 is rotatably mounted in the conventional manner upon a transverse shaft 18 which is carried on the tractor at the rear of the main body and has an outward extension upon which is journaled a bearing 19 which is in turn secured to channel 16 thereby connecting the track frame 8 to the rear of the main body. Sprocket 9 is engine driven in the conventional manner through a suitable transmission means and a final drive mechanism, not shown.

The front idler assembly 10 includes an idler pulley 11 rotatably carried on a shaft 23 which is nonrotatably mounted at opposite ends respectively by brackets 21 and 22 secured on a pair of support members or guides 24 and 25 which are slidably carried respectively upon channel members 16 and 17 of the truck frame 8 in a conventional manner. This type of mounting for an idler assembly is described in detail in U.S. Patent No. 2,326,486, E. F. Norelius, August 10, 1943.

The endless track belt 12 is of conventional construction and extends around the drive sprocket 9 and idler pulley 11, the latter being in thrust transmitting engagement with the rails 26 of the track link pairs 27, and the sprocket 9 drivingly engages the hinge pins 28 which pivotally interconnect the series of track link pairs 27.

Figure 3:
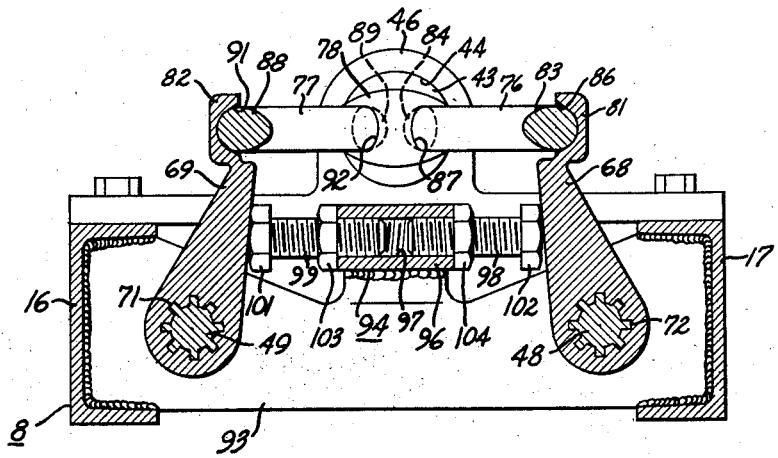
Fig. 3 is an enlarged sectional view taken through the entire self-laying track mechanism along line III—III in Fig. 2 showing the normal position of the thrust transmitting links and also showing the adjustable stop mechanism.
Figure 4:
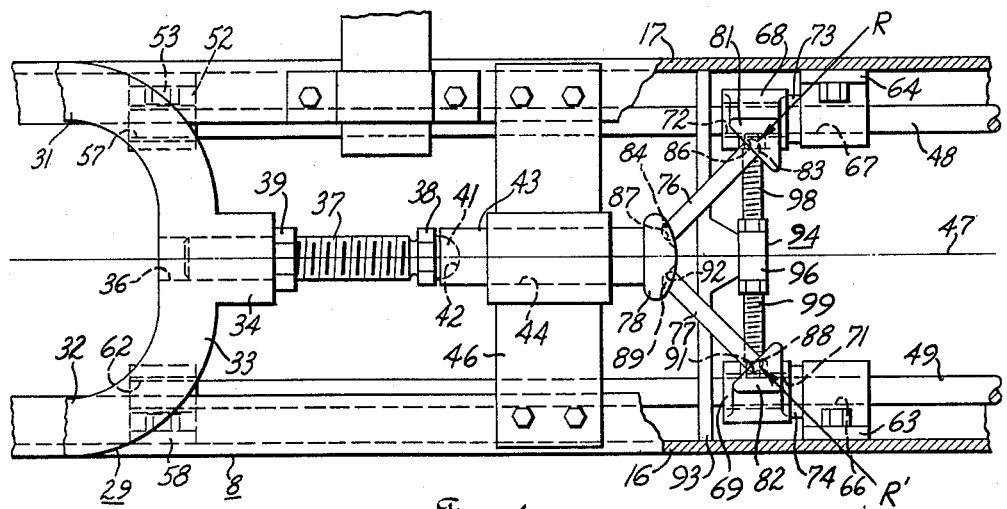
Fig. 4 is an enlarged top view of the track tensioning device in the normal operating position.
Figure 5:
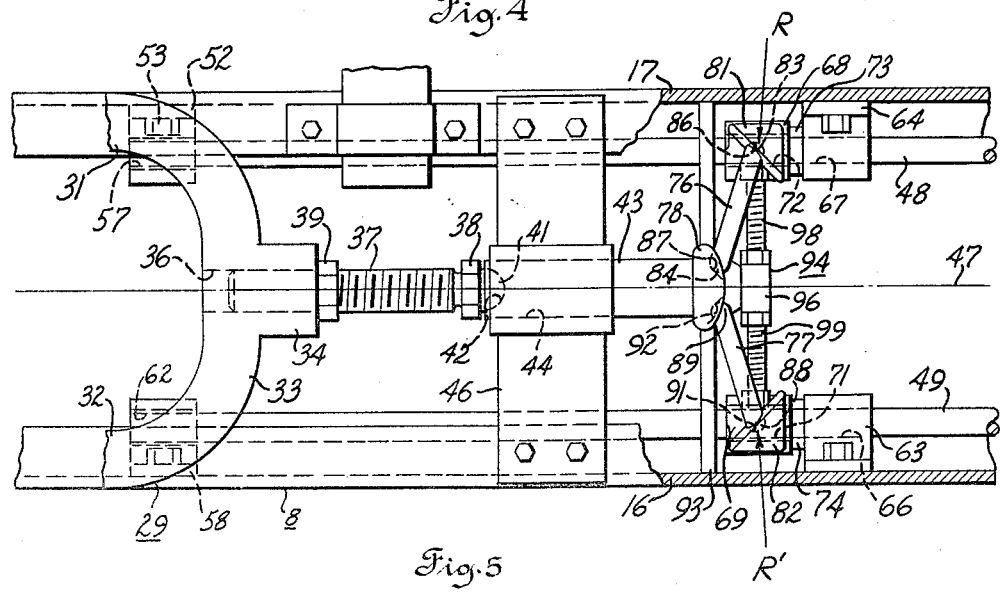
Fig. 5 is an enlarged view similar to Fig. 4 but showing the track tensioning device in a track releasing position.

Referring to Figs. 1, 2, 3, 4 and 5, the track tensional device will now be described in detail. A thrust transmitting yoke 29 extends rearwardly from the front idler assembly 10 and has two legs 31 and 32 at opposite sides respectively of the idler pulley 11 being secured respectively to the slidable support members 24 and 25. Formed integrally with the bridge portion 33 of yoke 29 is a rearwardly extending sleeve 34 and is provided with a threaded bore 36 having a horizontal longitudinally extending axis into which is received an adjusting screw 37. Adjusting screw 37 has a polygonal shoulder 38 for turning it within threaded bore 36; carries a lock nut 39 for securing screw 37 against turning within bore 36; and has a semispherical head 41 which is received in a complementary socket 42 of the crosshead 43. Crosshead 43 is slidably mounted in a bushing bore 44 provided in a brace member 46 which spans the respective channel members 16 and 17 being rigidly secured thereto. Crosshead 43 is axially slidable along a horizontal axis which extends longitudinally of the track mechanism and is indicated generally by line 47 in Figs. 4 and 5. A pair of oppositely spaced parallel torsion bars 48 and 49 extend longitudinally of the track frame 8 and are nested between channel members 16 and 17. The opposite ends of torsion bar 48 are anchored to channel member 17 by brackets 51 and 52 which are secured thereto, as by bolts 53 and 54, and which are provided with internally splined bores 56 and 57 to receive the externally splined ends of torsion bar 48. Torsion bar 49 is similarly anchored to channel member 16 by brackets 58 and 59 which are provided with internally splined bores 61 and 62 to receive the externally splined opposite ends of torsion bar 49. A pair of support brackets 63 and 64 are rigidly attached to the channel members 16 and 17 respectively and are provided with bushing bores 66 and 67 in which the torsion bars 49 and 48 are journaled respectively at a point intermediate their ends thereby adding stability by preventing undue deflection of the torsion bars. A pair of oppositely spaced upright torque transmitting arms 68 and 69 are provided with internally splined bores 71 and 72 which are carried respectively on externally splined portions of torsion bars 48 and 49 adjacent the associated support brackets 64 and 63. A pair of thrust bearings 73 and 74 are juxtaposed respectively with arms 68 and bracket 64, and arm 69 and bracket 63 to resist movement of the arms 68 and 69 axially of the associated torsion bars in a direction toward the rear of the track frame. A pair of thrust transmitting links 76 and 77 are interposed respectively between the head portion 78 at one end of crosshead 43 and head portions 81 and 82 of the torque transmitting arms 68 and 69 and are arranged so that their respective axes are disposed at an angle to the longitudinal axis 47, shown in Figs. 4 and 5, of crosshead 43. Referring to Figs. 3, 4 and 5, opposite ends of link 76 are provided with semispherical heads 83 and 84 which are received into outwardly tapering conical recesses 86 and 87 provided respectively in head 81 of torque arm 68 and head 78 of crosshead 43.

Heads 83 and 84 in effect constitute thrust elements and recesses 86 and 87, constitute corresponding socket elements which bear upon each other in thrust transmitting relationship in one direction and which are freely separable from each other in the opposite direction. Opposite ends of link 77 are provided with semispherical heads 88 and 89, similar to link 76, which are similarly received into outwardly tapering conical recesses 91 and 92 of head 82 and head 78 respectively.

Referring again to Figs. 1, 2, 3, 4 and 5, a vertical plate 93 is rigidly connected at opposite ends respectively to channel members 16 and 17 and serves as a support for an adjustable stop mechanism 94 which is operatively disposed intermediate oppositely spaced torque arms 68 and 69. Stop mechanism 94 includes a sleeve 96 having a transverse threaded bore 97 into which is received a pair of adjusting screws 98 and 99 at opposite ends respectively. Adjusting screws 98 and 99 have heads 101 and 102 which are engageable respectively with portions of arms 68 and 69 to limit movement of the arms in a torque releasing direction. A pair of lock nuts 103 and 104 are carried respectively by screws 98 and 99 for locking the screws in their adjusted positions.

*Operation*

From the foregoing description it will be seen that the torsion bars 48 and 49, torque arms 68 and 69, thrust links 76 and 77, crosshead 43 and the adjustable linkage provided by yoke 29 and screw 37 serve as a tensioning means for maintaining tension in the track belt by urging the idler pulley into engagement therewith. In assembling the track tensioning means the torsion bars 48 and 49 may be preloaded; and consequently, a predetermined amount of tension on the track belt 12 may be obtained by first rotating adjusting screw 37 in bore 36 in a direction to expand the distance between yoke 29 and crosshead 43 thereby urging idler pulley 11 in a direction away from drive sprocket 9 and into engagement with track belt 12. After idler pulley 11 is brought into engagement with track belt 12 further expansion of adjusting screw 37 in bore 36 will displace crosshead 43 in the longitudinal axial direction along axis 47 toward drive sprocket 9 which will tend to rotate torque arms 68 and 69 outwardly in opposite directions along an arcuate path. Rotation of arms 68 and 69 tends to twist and thereby torsionally stress torsion bars 48 and 49. In the stressed condition bars 48 and 49 form an elastic means for resisting the reactive thrust of the idler pulley, this thrust being transmitted between the idler pulley and torsion bars through shaft 23, brackets 21 and 22, support 24, yoke 29, screw 37, crosshead 43, links 76 and 77, and arms 68 and 69.

Referring to Fig. 4, the tensioning means is shown in the normal operating position. According to well known mathematical calculations, the amount of torsional stress in a torsion bar, or conversely the amount of torsional reaction or spring force exerted thereby, is proportional to the angle of twist of the bar provided that the elastic limit of the material is not exceeded. Therefore, as torsion bars 48 and 49 are twisted by arcuate movement of torque arms 68 and 69, the stress or spring force will increase proportionally. The amount of reactive force, however, that torsion arms 68 and 69 exert on crosshead 43 through links 76 and 77 is determined by the angle that the axis of the resultant force, acting at the point of contact between recess 86 and head 83, and recess 91 and head 88 and indicated by arrows R and R$^1$, makes with the longitudinal axis 47 since only the longitudinal component of the resultant force will be transmitted to the crosshead.

Referring now to Fig. 5, a track release position of the tension means is shown which occurs when a piece of noncompressible matter, such as a rock, becomes lodged between the track belt and a member of the track supporting structure or at such other times when the tension in the track belt 12 exceeds a predetermined amount. Referring now to Figs. 1, 2 and 5, assume that a rock has become wedged between the sprocket 9 and the track belt 12, causing the track tension to increase above normal. As a result of this abnormally high tension, additional back thrust or back pressure is imposed upon the idler pulley 11. Then back thrust is transmitted through shaft 23, brackets 21 and 22 and yoke 29 to crosshead 43 and as this thrust tends to overcome the resisting force being exerted by the torsion bars 48 and 49 through arms 68 and 69 and links 76 and 77, idler pulley assembly 10 will be displaced longitudinally of the track frame in the direction toward sprocket 9. This is the track release position as shown in Fig. 5. Referring to Fig. 5, as the idler assembly 10, slidable guides 24 and 25, yoke 29, screw 37 and crosshead 43 are simultaneously displaced in a direction toward sprocket 9, links 76 and 77 are wedged by crosshead 43 between the torque arms 68 and 69 rotating them in an outward and opposite direction along an arcuate path concentric with the axis of their associated torsion bar. The arcuate movement of the torque arms 68 and 69 tends to twist torsion bars 48 and 49 thereby proportionally increasing the stress therein which at the same time increases the resultant resisting forces R and $R^1$ exerted by the torque arms in the opposite or stress releasing direction. The amount of this resultant force, however, that is exerted by torque arms 68 and 69 in the longitudinal direction through links 76 and 77 to crosshead 43 will remain nearly constant. This is so because the angle between the axis of the resultant forces R and $R^1$ and the longitudinal axis 47 approaches 90 degrees and the component of the resultant force acting longitudinally is a function of the cosine of this angle and the cosine is decreasing. In other words the magnitude of the longitudinal component of a constant resultant force would decrease as the cosine decreases; but since the magnitude of the resultant force in this instance is increasing, the longitudinal component will remain relatively constant over a limited range when the cosine of the angle decreases at a rate nearly proportional to the rate of increase of the resultant force.

From the foregoing detailed description it will be apparent that a new and improved track tensioning device has been illustrated which utilizes a simple torsion bar and thrust transmitting linkage for providing tension in the track belt of a self-laying track mechanism of a crawler tractor. Also the additional feature has been shown and described of providing a nearly constant force upon the idler pulley throughout a predetermined range of longitudinal displacement into a track releasing position. In carrying out the invention a pair of torsion bars together with opposed thrust transmitting links are preferred as this arrangement will result in a minimum of side thrust on the crosshead. It is to be understood, however, that this is not intended to so limit the invention as it would be entirely possible to use a single torsion bar and associated linkage.

It is to be understood further that although only one embodiment of the present invention has been shown and described in detail, various changes and modifications may be used without departing from the spirit and scope of the invention as defined in the appended claims.

What is claimed is:

1. In a self-laying track mechanism a track frame; an idler pulley assembly slidably mounted on said track frame for movement longitudinally thereof; a drive sprocket carried on said track frame; an endless track belt extending about said drive sprocket and said idler pulley; and tensioning means carried on said track frame being positioned between said idler pulley assembly and said drive sprocket for maintaining tension in said track belt, said tensioning means comprising a torsion bar having one end nonrotatably anchored on said track frame, a torque transmitting arm nonrotatably carried upon said torsion bar, and means connecting said arm and said idler pulley assembly in thrust transmitting relationship whereby torsional stress in said bar urges said idler pulley assembly into thrust transmitting engagement with said track belt.

2. In a self-laying track mechanism in a track frame; an idler pulley assembly slidably mounted on said track frame for movement longitudinally thereof; a drive sprocket carried on said track frame; an endless track belt extending about said drive sprocket and said idler pulley assembly; and tensioning means interposed between said idler pulley assembly and said drive sprocket for maintaining tension in said track belt, said tensioning means comprising a torsion bar having one end nonrotatably mounted on said track frame, a radially extending torque transmitting arm nonrotatably carried on said torsion bar, and means for connecting said arm and said idler pulley assembly in thrust transmitting relationship including a link member disposed in thrust transmitting engagement with said arm for transmitting torsional stress from said torsion bar to said idler pulley assembly thereby urging the latter into thrust transmitting engagement with said track belt.

3. In a self-laying track mechanism a track frame; an idler pulley assembly slidably mounted on one end of said track frame for movement longitudinally thereof; a drive sprocket carried on the opposite end of said track frame; an endless track belt extending about said drive sprocket and said idler pulley assembly; and tensioning means positioned between said idler pulley assembly and said drive sprocket for maintaining tension in said track belt, said tensioning means comprising a torsion bar having an axis extending longitudinally of said track frame, means anchoring one end of said torsion bar on said track frame, a radially extending torque transmitting arm nonrotatably carried on said torsion bar in axially spaced relation to said one end, and means including a link member in thrust transmitting engagement with said torque trasmitting arm for transmitting torsional stress in said torsion bar thereby urging said idler pulley assembly into thrust transmitting engagement with said track belt.

4. In a self-laying track mechanism a track frame; an idler pulley assembly slidably mounted on one end of said track frame for movement longitudinally thereof; a drive sprocket carried on the opposite end of said track frame; an endless track belt extending about said drive sprocket and idler pulley assembly; and tensioning means carried on said track frame being positioned between said idler pulley assembly and said drive sprocket for maintaining tension in said track belt, said tensioning means comprising a torsion bar having one end nonrotatably achored on said track frame, a torque transmitting arm nonrotatably anchored on said torsion bar, and thrust transmitting means connecting said arm and said idler pulley assembly including a link member having one end in thrust transmitting engagement with said arm, said link member having a longitudinal axis which intersects an axis extending longitudinally of said track frame at an angle, said link member being operative to transmit torsional stress in said torsion bar along the longitudinal axis of the track frame for urging said idler pulley assembly into thrust transmitting engagement with said track belt.

5. In a self-laying track mechanism a track frame; an idler pulley assembly slidably mounted on said track frame for movement longitudinally thereof; a drive sprocket carried on said track frame; an endless track belt extending about said sprocket and said idler pulley; and tensioning means positioned between said idler pulley assembly and said drive sprocket for maintaining tension in said track belt, said tensioning means comprising a torsion bar having an axis extending longitudinally of and having opposite ends nonrotatably anchored respectively on said track frame, a torque transmitting arm nonrotatably anchored on said torsion bar intermediate the opposite ends thereof, and thrust transmitting means connecting said arm and said idler pulley assembly including a link member having one end in thrust transmitting engagement with said arm, said link member having a longitudinal axis disposed at an angle to an axis extending longitudinally of said track frame and being operative to transmit torsional stress in said torsion bar along the longitudinal axis of said track frame for urging said idler pulley in a direction away from said drive sprocket and into thrust transmitting engagement with said track belt.

6. In a self-laying track mechanism a track frame; an idler pulley slidably mounted in said track frame for movement longitudinally thereof; a drive sprocket carried on said track frame; an endless track belt extending about said drive sprocket and said idler pulley assembly; and tensioning means positioned between said idler pulley assembly and said drive sprocket for maintaining tension in said track belt, said tensioning means comprising an axially slidable crosshead mounted on said track frame for movement along an axis extending longitudinally of the latter, means interconnecting said crosshead and said idler pulley assembly for transmitting thrust therebetween, a torsion bar having one end nonrotatably anchored on said track frame; a torque transmitting arm nonrotatably carried on said torsion bar, and a link member interposed in thrust transmitting engagement between said arm and said crosshead whereby torsional stress in said torsion bar is transmitted to said crosshead for urging said idler pulley assembly into thrust transmitting engagement with said track belt.

7. In a self-laying track mechanism a track belt; an idler pulley assembly slidably mounted on said track frame for movement longitudinally thereof; a drive sprocket carried on said track frame; an endless track belt extending about said drive sprocket and said idler pulley assembly; and tensioning means positioned between said idler pulley assembly and said drive sprocket for maintaining tension in said track belt, said tensioning means comprising an axially slidable crosshead mounted on said track frame for movement along an axis extending longitudinally of the latter, means interconnecting said crosshead and said idler pulley assembly for transmitting thrust therebetween, a torsion bar having one end nonrotatably anchored on said track frame, a torque transmitting arm nonrotatably carried on said torsion bar, and a link member having opposite ends secured in thrust transmitting engagement respectively with said arm and said crosshead, said link member having a longitudinal axis disposed at an angle to an axis extending longitudinally of said crosshead so that axial movement of said crosshead adjusts the angle between the latter and said link member.

8. In a self-laying track mechanism a track frame; an idler pulley assembly slidably mounted on said track frame for movement longitudinally thereof; a drive sprocket carried on said track frame; an endless track belt extending about said drive sprocket and said idler pulley assembly; and tensioning means positioned between said idler pulley assembly and said drive sprocket for urging the former in a direction away from the latter thereby maintaining tension in said track belt, said tensioning means comprising an axially reciprocable crosshead mounted on said track frame for movement along an axis extending longitudinally of the track frame, an adjustable linkage means for interconnecting one end of said crosshead and said idler pulley assembly in thrust transmitting relationship and for adjusting the axial distance therebetween, a torsion bar extending longitudinally of and having one end nonrotatably anchored on said track frame, a torque transmitting arm nonrotatably anchored on said torsion bar, and a link member having opposite ends secured in thrust transmitting engagement respectively between said arm and the other end of said crosshead, said link member having a longitudinal axis disposed at an angle to the longitudinal axis of said crosshead whereby axial movement of said crosshead adjusts the angle between the longitudinal axes respectively of said link member and crosshead.

9. In a self-laying track mechanism a track frame; an idler pulley assembly slidably mounted on said track frame for movement longitudinally thereof; a drive sprocket carried on said track frame; an endless track belt extending about said drive sprocket and said idler pulley assembly; and tensioning means interposed between said idler pulley assembly and said drive sprocket for maintaining tension in said track belt, said tensioning means comprising a torsion bar extending longitudinally of and having one end nonrotatably anchored on said track frame, a torque transmitting arm extending radially of and nonrotatably anchored on said torsion bar, an axially reciprocable crosshead mounted on said track frame between said idler pulley assembly and said arm for movement along an axis extending longitudinally of said track frame, a link member having opposite ends secured respectively in thrust transmitting engagement with said arm and one end of said crosshead, said link member having a longitudinal axis disposed at an angle to the longitudinal axis of said crosshead so that displacement of said crosshead causes arcuate movement of said arm about the axis of said torsion bar thereby adjusting the angle between the longitudinal axes of said crosshead and said link member, and means including an adjustable linkage interconnecting the other end of said crosshead and said idler pulley assembly for transmitting thrust therebetween and for adjusting the axial distance therebetween, expansion of said adjustable linkage being operative to torsionally stress said torsion bar and urge said idler pulley into thrust transmitting engagement with said track belt.

10. In a self-laying track mechanism the combination of a track frame; an idler pulley assembly slidably mounted on one end of said track frame for movement longitudinally thereof; a drive sprocket carried on the opposite end of said track frame; an endless track belt extending about said drive sprocket and said idler pulley assembly; and tensioning means positioned between said idler pulley assembly and said drive sprocket for maintaining tension in said track belt, said tensioning means comprising a pair of laterally spaced torsion bars extending longitudinally of and having their opposite ends respectively nonrotatably anchored on said track frame, a pair of oppositely spaced torque transmitting arms being nonrotatably anchored respectively on said torsion bars intermediate the opposite ends thereof, an axially slidable crosshead mounted on said track frame for reciprocable movement along an axis extending longitudinally thereof, said crosshead being positioned on said track frame between said idler pulley assembly and said torque transmitting arms, means including an adjustable linkage interconnecting one end of said crosshead and said idler pulley assembly for transmitting thrust and for adjusting the axial distance therebetween, a pair of link members respectively connected in thrust transmitting relationship between said torque transmitting arms and the other end of said crosshead, each of said link members having a longitudinal axis intersecting the longitudinal axis of said crosshead at an angle whereby simultaneous displacement of said idler pulley and said crosshead longitudinally of said track frame in a direction toward said sprocket adjusts the angle between the axes of said link members and the longitudinal axis of said crosshead causing arcuate movement of said arms about the axis of said torsion bars torsionally stressing the latter respectively and whereby displacement of said idler pulley assembly and said crosshead in the opposite direction results in arcuate movement of said arms in a direction to release torsional stress in said torsion bars, and adjustable stop means secured on said track frame and positioned intermediate said torque transmitting arms, said stop means having stop elements engageable respectively with said pair of torque transmitting arms to limit arcuate movement of the latter in the torsional stress releasing direction.

References Cited in the file of this patent

UNITED STATES PATENTS

| | | |
|---|---|---|
| 1,442,568 | Holt | Jan. 16, 1923 |
| 2,326,486 | Norelius | Aug. 10, 1943 |